United States Patent [19]

Fujita

[11] Patent Number: 4,792,869

[45] Date of Patent: Dec. 20, 1988

[54] ELECTRONIC APPARATUS FOR PROPER HANDLING OF INTERCHANGEABLE MEMORY

[75] Inventor: Takayuki Fujita, Kawasaki, Japan

[73] Assignee: Canon Kabushiki Kaisha, Tokyo, Japan

[21] Appl. No.: 31,173

[22] Filed: Mar. 26, 1987

Related U.S. Application Data

[63] Continuation of Ser. No. 591,989, Mar. 21, 1984, abandoned, which is a continuation of Ser. No. 217,824, Dec. 18, 1980, abandoned, which is a continuation of Ser. No. 27,725, Apr. 6, 1979, abandoned.

[30] Foreign Application Priority Data

Apr. 14, 1978 [JP] Japan ............... 53-44463

[51] Int. Cl.[4] .................. G11B 5/02; G11B 5/09; G11B 5/54
[52] U.S. Cl. ..................... 360/69; 360/72.2; 360/75; 360/48
[58] Field of Search ........ 360/72.3, 72.2, 71, 360/48, 49, 75, 97, 99, 69; 369/14

[56] References Cited

U.S. PATENT DOCUMENTS

| | | | |
|---|---|---|---|
| 2,761,017 | 8/1956 | Camras | 360/60 |
| 3,375,507 | 3/1968 | Gleim et al. | 360/49 X |
| 3,417,387 | 12/1968 | Rayfield | 360/60 |
| 3,701,130 | 10/1972 | Ault | 360/49 |
| 3,797,037 | 3/1974 | Kolpek | 360/72.2 |
| 3,829,837 | 8/1974 | Farr, Jr. | 360/48 X |
| 3,848,235 | 11/1974 | Lewis et al. | 360/48 X |
| 4,016,603 | 4/1977 | Ottesen | 360/72.2 |
| 4,086,636 | 4/1978 | Cizmic et al. | 360/75 |
| 4,134,138 | 1/1979 | Cardot et al. | 360/48 X |
| 4,151,571 | 4/1979 | Cordot et al. | 360/48 X |
| 4,210,941 | 7/1980 | Kashio | 360/72.1 |
| 4,296,491 | 10/1981 | Jerome | 360/72.2 X |
| 4,733,314 | 3/1988 | Ogawa et al. | 360/97 |

OTHER PUBLICATIONS

SMPTE Journal vol. 86, No. 4 Apr., 1977. E/I Features of the Optical Video disc System, Cavanaugh.
IBM-TDB vol. 25. No. 2 July, 1982 Optical/Magnetic Storage Disk System by M. B. Jordan.
IBM-TDB vol. 22, No. 3 Aug., 1979 Video Disk with Updating Feature by C. A. Bruce et al.
IBM-TDB vol. 22, No. 1 Jun., 1979 Index Amplifier Control for Detecting Diskettes in Disk Drive, Russell et al.

Primary Examiner—Raymond F. Cardillo
Assistant Examiner—Alyssa H. Bowler
Attorney, Agent, or Firm—Fitzpatrick, Cella, Harper & Scinto

[57] ABSTRACT

An electronic apparatus utilizing an external memory such as a floppy disc or a cassette tape has a signal generator for generating a signal to indicate the interchange of the external memory. Upon detection of the signal, the interchanged external memory is properly handled.

6 Claims, 4 Drawing Sheets

ELECTRONIC APPARATUS FOR PROPER HANDLING OF INTERCHANGEABLE MEMORY

This application is a continuation of application Ser. No. 591,989 filed Mar. 21, 1984, abandoned, which is in turn a continuation of Ser. No. 217,824, filed Dec. 18, 1980, abandoned, which is in turn a continuation of Ser. No. 27,725, filed Apr. 6, 1979, abandoned.

BACKGROUND OF THE INVENTION

1. Field of the Invention

The present invention relates to an electronic apparatus with reduced errors, and more particularly to an electronic apparatus capable, in centralized control of information on position, dimension and form of plural data files formed on a memory medium such as a floppy disc or a cassette tape, of detecting the interchange of said memory medium without prior notice and automatically correcting the information for file control.

2. Description of the Prior Art

In a conventional electronic apparatus utilizing an external memory such as a disc or a magnetic tape, the interchange of such external memory during the use of said apparatus has to be transmitted to the operator through push button switches or a console of the apparatus. Thus the centralized control of the data files has not been possible in a small-sized apparatus using a floppy disc or a cassette not provided with such transmitting ability.

Also in a more sophisticated data file structure in which data files are formed in a memory medium such as a floppy disc or a cassette tape and the control information for said data files is recorded in a particular position on said memory medium for achieving centralized control on said data files, it is desirable, for a faster operation, to partly or entirely transcribe said control information from said memory medium to a main memory at each interchange of the memory medium and not to refer thereafter to the control information recorded on said memory medium at the formation, deletion, read-out or write-in of the data files themselves.

In case the memory medium is interchanged without prior notice in such system, it will result that the data processing on the new memory medium is conducted with the control information for the preceding memory medium, thus leading to erroneous result or even to destruction of the data files.

SUMMARY OF THE INVENTION

The object of the present invention is to provide an electronic apparatus provided with a function of detecting the interchange of the memory medii and capable of automatically correcting the file control information without waiting the instruction by the operator at such interchange thereby achieving correct data processing and preservation of data files.

Another object of the present invention is to provide an electronic apparatus utilizing an external memory medium such as a floppy disc or a cassette tape, comprising means for generating a signal for indicating the interchange of said external memory medium and means for displacing, in response to said signal, reading head to a particular position thereby re-reading the file control information.

Still another object of the present invention is to provide an electronic apparatus comprising means for detecting the mounting of said memory medium on said apparatus and means adapted to function in response to said detecting means and capable of identifying thus mounted memory medium, thereby enabling the apparatus to properly handle said memory medium.

Still other objects of the present invention will be made apparent from the following description of the embodiments thereof taken in conjunction with the attached drawings.

DESCRIPTION OF THE PREFERRED EMBODIMENTS

Figure 1:
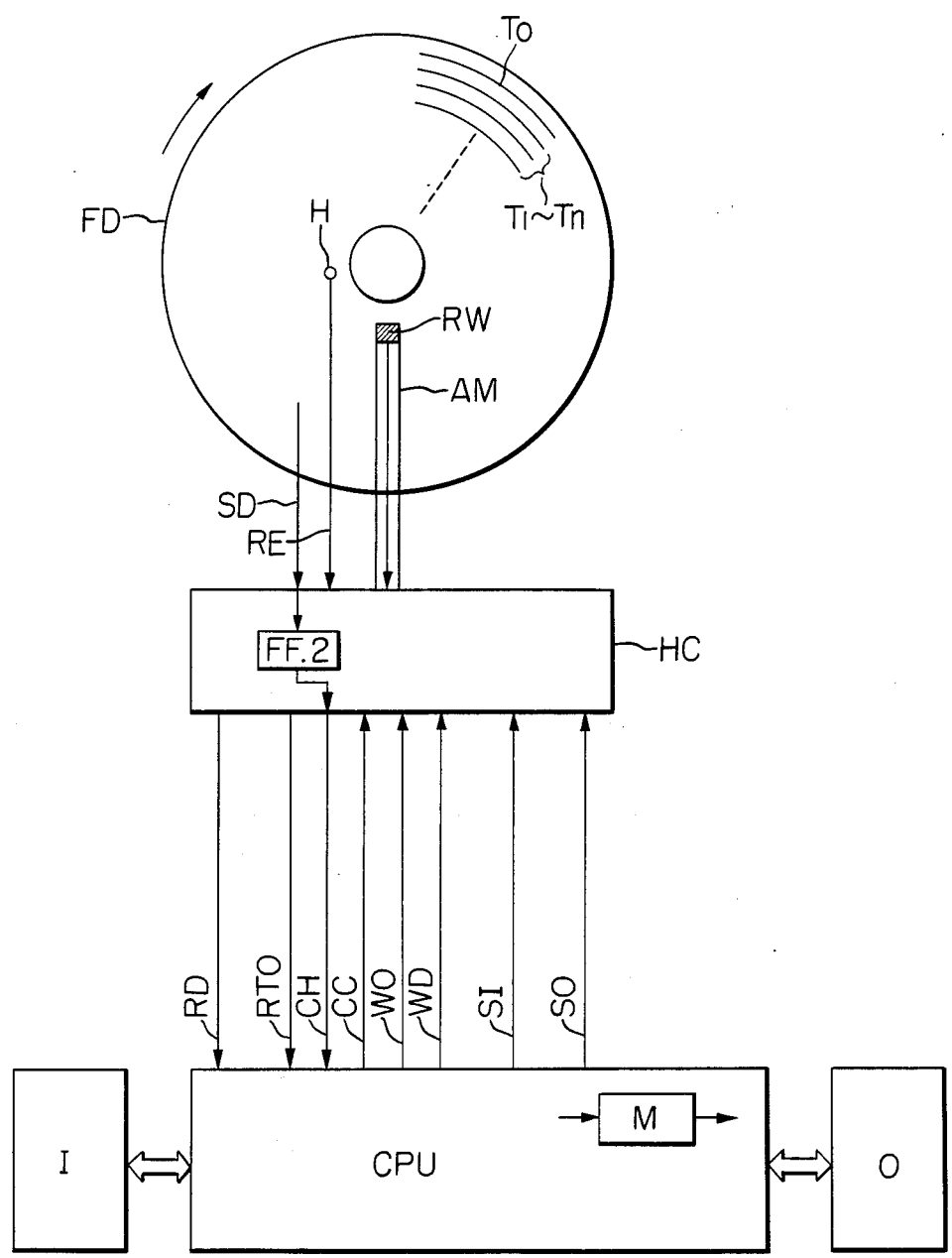
FIG. 1 is a schematic view of a first embodiment of the present invention.

Referring to FIG. 1 schematically showing a first embodiment of the present invention, the file control information is recorded on a 0-th track T0 of a floppy disc sheet FD while the data files are recorded on the first and ensuing tracks T1–Tn. A read-write head RW is provided to read or write the data from or into a track on which said head is located. AM is an arm for displacing said head, and HC is a head control unit comprising circuitry for head control and other control and a stepping motor, whereby said head being stepwise displaced outwardly or inwardly upon receipt of a stepping signal through control line SO or SI from a central processing unit CPU. Also a track-0 read line RTO is provided to inform the central processing unit CPU that the head RW is located on the track 0.

In case of reading or writing data from or into the data files T1–Tn on said floppy disc sheet FD, it is identified at first whether the disc sheet FD is interchanged, by means of whether the flip-flop FF" is in a set state or not. An eventual high-level set signal, indicating that the disc has been interchanged, is thus transmitted to the central processing unit, in which case the file control information T0 already stored in a memory M within said processing unit CPU belonging to the previous disc sheet is no longer useful and has to be replaced by the file control information of the new disc sheet recorded on the 0-th track T0 thereof. Thus the processing unit CPU releases the outward stepping pulses through the control line SO until the track 0 signal is obtained on the line RTO, i.e., until the head RW is displaced to the 0th track T0. Successively a read line RD receives the data read from track to revise the file control information on said memory M. The process thereafter is conducted in the same manner as when the disc sheet is not interchanged. The position of data file on which the data read-out or write-in is required is identified from the life control information stored in said memory M, and a suitable number of stepping pulses is supplied through the line SO or SI to displace the head RW to an appropriate position. In case of data read-out, the processing unit CPU receives the data through the read-out line RD and accepts the necessary portion thereof, while in case of data write-in the processing unit CPU, watching the read-out data, releases the write-in instruction WO and the data to be written WD thereby achieving the appropriate data write-in.

In FIG. 1, there are also shown an index hole H provided on the floppy disk sheet FD to transmit the state of rotation thereof to the head control unit HC, thereby enabling to identify if the data read-out or write-in is possible, an input device I such as a keyboard, and an output device O such as a display or print device.

Figure 2A:
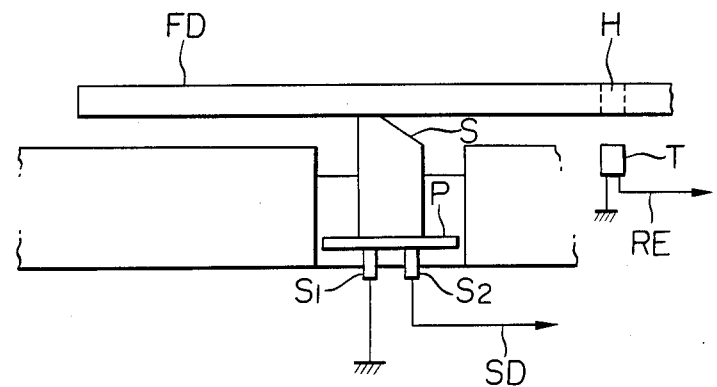
FIGS. 2A and 2B are views showing an example of the memory medium detecting mechanism.
Figure 2B:
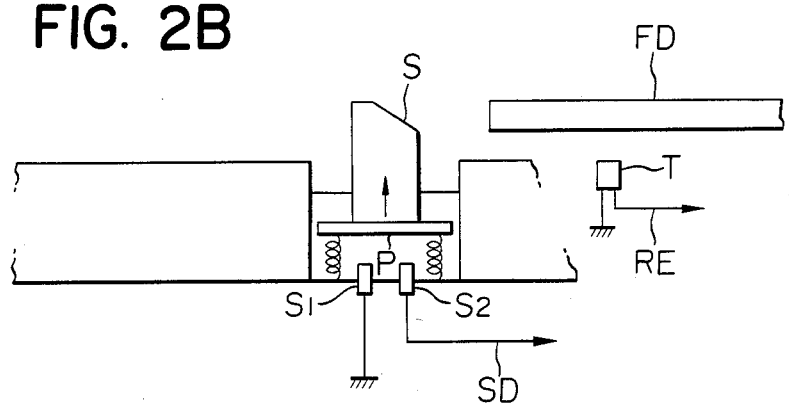

FIG. 2 shows an example of the mechanism constituting a part of the floppy disc device and informing the central processing unit CPU that the floppy disc sheet FD is interchanged, wherein FIG. 2A showing a state wherein said sheet FS is inserted and FIG. 2B showing a state where said sheet FD is extracted. In said mechanism there is provided a member S vertically displaceable by said disc sheet FD, said member being adapted to shortcircuit the terminals S1 and S2 by an electrode P when depressed by the disc sheet FD and open the connection between said terminals S1 and S2 when the disc sheet is extracted, thereby causing a change in the output signal on the line SD, which is detected by the head control unit HC shown in FIG. 1. Also there is provided an element T for detecting the index hole H of the disc sheet and thus releasing a signal, on the line RE, for transmitting the state of rotation of the disc sheet.

Figure 3A:
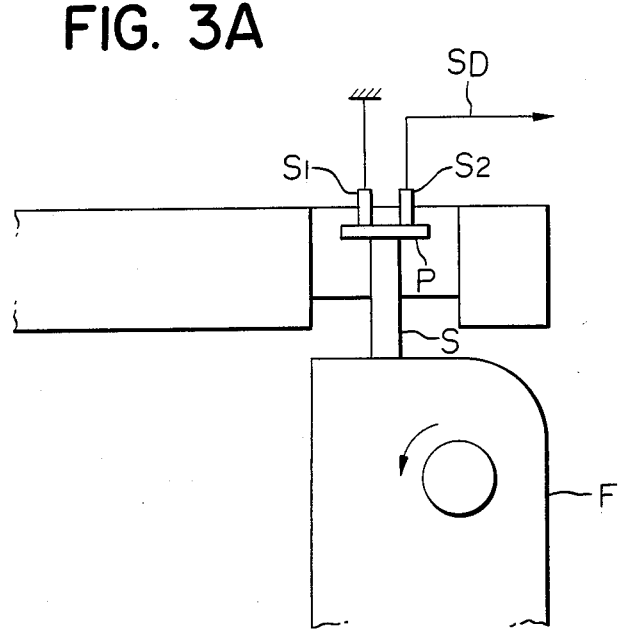
FIGS. 3A and 3B are views showing another example.
Figure 3B:
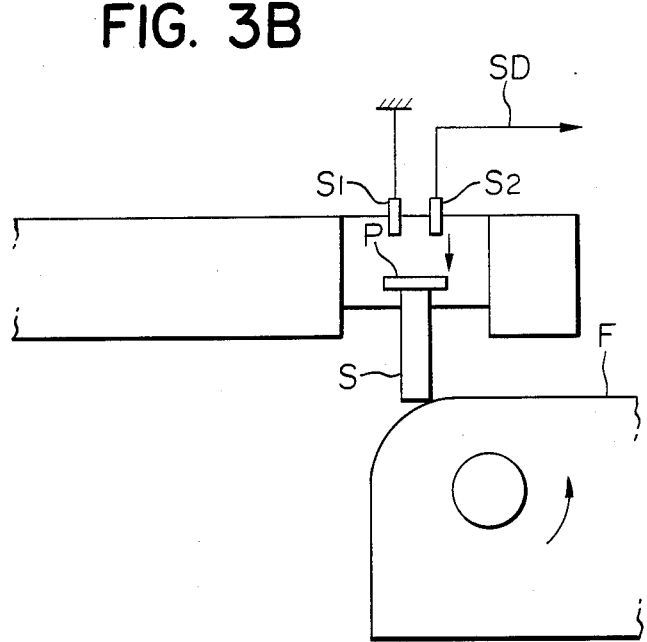

FIG. 3 shows another example of the above-mentioned mechanism constituting a part of the lid of the floppy disc device, wherein the interchange of the floppy disc sheet being identified by opening of said lid. FIGS. 3A and 3B respectively show the states wherein the lid F is closed or opened, wherein the signal on the line SD changes by the manipulation of the lid F in the same manner as explained in connection with FIG. 2 and is detected by the head control unit HC shown in FIG. 1.

Figure 4:
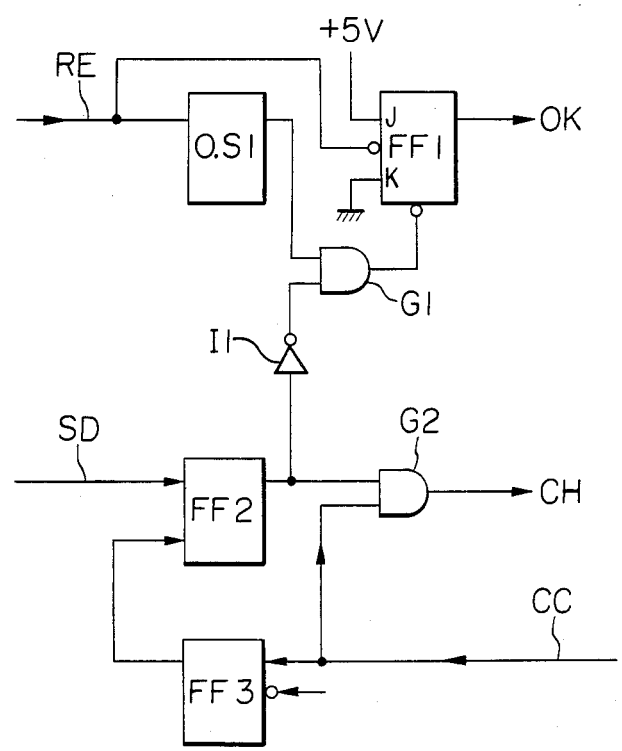
FIG. 4 is a diagram showing an example of the circuit.

FIG. 4 shows an example of the circuit, in the head control unit HC, for generating a signal OK for advising that the floppy disc sheet FD is ready for read-out and a signal CH for advising whether the disc sheet has been interchanged. In FIG. 4 a one-shot multivibrator OS1 is designed with a time constant equal to the maximum rotation time permitted for the floppy disc sheet FD. In case the rotation of the floppy disc sheet FD is too slow, the flip-flop FF1 is not set since the output of said multivibrator OS1 is not maintained during one full rotation of the disc sheet FD. When the rotation of the floppy disc sheet FD reaches a rated speed, the line RE receives one pulse for each rotation to trigger the one-shot multivibrator OS1. Since the time constant thereof is determined longer than the interval of said pulses, the flip-flop FF1 constantly maintains the set-state, whereby the signal OK is constantly maintained at a high level, indicating that the disc is ready for signal read-out. Upon interchange of the disc sheet FD there is released a pulse on the line SD to set the flip-flop FF2, and the output of the vibrator OS1 is also changed to a low level whereby the flip-flop FF1 is reset to change the OK signal to a low level. Also the signal CH indicating the signal interchange is read by a control signal supplied through the read-out instruction signal line CC from the central processing unit CPU. Said flip-flop FF2 is reset after the lapse of the read-out time by a flip-flop FF3 to prepare for the next disc interchange. Thus the central processing unit CPU is informed of the disc interchange upon receipt of the signal CH. Consequently prior to the processes of the data read-out or write-in from or into the memory medium, the processing unit CPU reads the signal CH to identify whether the memory medium has been interchanged, and, if so, re-reads the file control information T0 in the memory medium according the aforementioned procedure, thus transcribing said information into the memory M. Thereafter, or, if the interchange of the memory medium is not effected, the data read-out or write-in can be carried out according to the above-explained signal OK. Also if the memory medium is interchanged during the procedure of the data read-out or write-in, the signal OK is changed to the lower level, thereby indicating the presence of an abnormality, which can be transmitted to the operator either through the display unit or through the printer. Such printing is useful for confirming the interchange of the memory medium afterwards.

Figure 5:
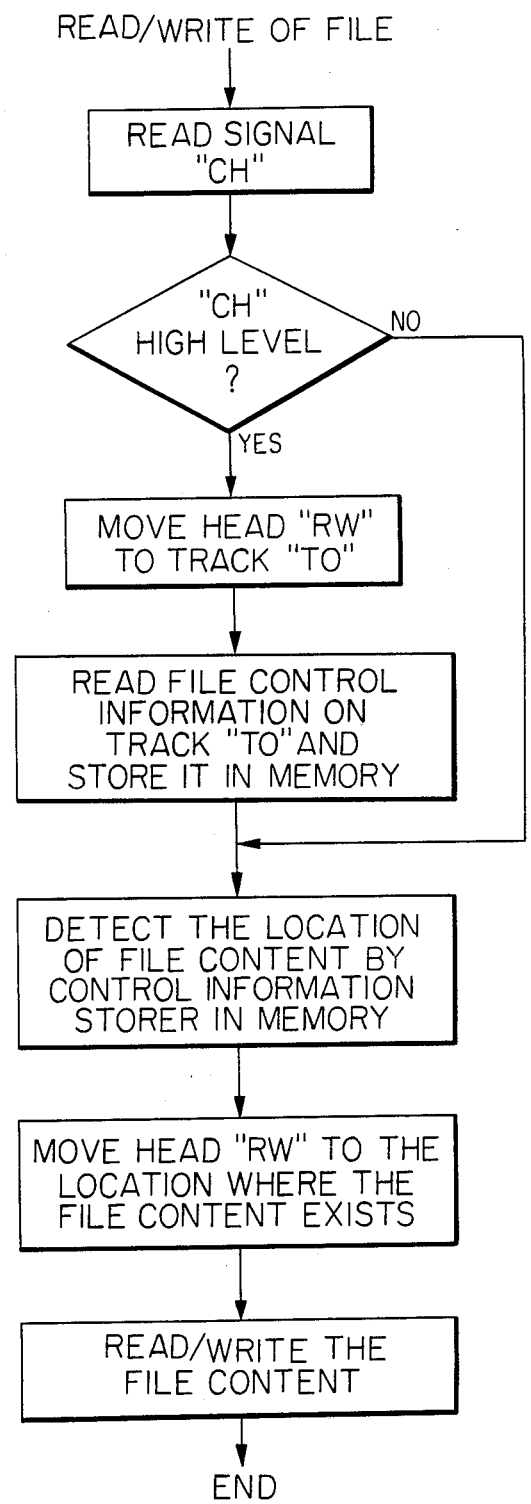
FIG. 5 is a flow chart explaining the function of the apparatus of the present invention.

FIG. 5 shows the flow chart explaining the functions of the apparatus of the present invention.

As explained in the foregoing, the electronic apparatus of the present invention allows the operator to interchange the memory medium at any time, without any necessity to inform the apparatus of such interchange. Also the present invention enables to construct sophisticated data files on the recording medii, still allowing easy operation without any error.

What I claim is:

1. An electronic apparatus using a removable external memory device for storing a file of data to be processed and control data associated with said data to be processed, said external memory device being provided with a recording track, wherein said file of data and said control data are recorded in mutually different locations of said recording track, comprising:
   detection means for detecting that a said removable external memory device is removed from said apparatus and that a said memory device is again mounted thereon;
   head means disposed facing said removable external memory device;
   first control means for causing said head means to read out said control data recorded on said recording track when said detection means detects the said mounting of said removable external memory device on said apparatus;
   storage means for storing said control data read out from said recording track by said head means under control of said first control means; and
   second control means for identifying predetermined data of said file of data recorded on said recording track of said removable external memory device in accordance with said control data stored in said storage means, and for controlling the reading out of the identified data.

2. An apparatus according to claim 1, wherein said first control means includes means for rewriting the control data stored in said storage means.

3. An electronic apparatus according to claim 1, wherein said external memory device is provided with a plurality of recording tracks, said control data being stored in one part of said plurality of recording tracks and said file of data being stored in another part thereof.

4. An electronic apparatus according to claim 1, wherein said control data includes memory location information of said file of data.

5. An electronic apparatus according to claim 1, wherein said external memory device is provided with at least a single recording track, wherein said file of data and said control data are recorded on mutually different locations of said recording track.

6. A method for detecting the insertion of a removable memory into a data processing apparatus, and for automatically determining the file structure of other data stored in the removable memory, comprising the steps of:
  inserting a removable memory into a data processing apparatus to couple said removable memory operatively to said apparatus;
  producing a detecting signal indicative of said insertion of said removable memory into said apparatus each time said insertion is made into said apparatus;
  reading out from said removable memory in response to said detecting signal and while said removable memory is operatively coupled to said apparatus, information which is stored in said removable memory and which is descriptive of a file structure of the other data stored in said removable memory, said reading out step being performed by said data processing apparatus;
  storing the read-out file structure information in a memory in said apparatus for reading out said data stored in the inserted removable memory; and
  reading and processing the other data stored in said removable memory identified by said file structure information stored in said apparatus.

* * * * *

UNITED STATES PATENT AND TRADEMARK OFFICE
CERTIFICATE OF CORRECTION

PATENT NO. : 4,792,869

DATED : December 20, 1988

INVENTOR(S) : TAKAYUKI FUJITA

It is certified that error appears in the above-identified patent and that said Letters Patent is hereby corrected as shown below:

On the Title Page,

IN [56] REFERENCES CITED

Under U.S. Patent Documents, "Cordot et al." should read --Cardot et al.--.

COLUMN 2

Line 61, "life" should read --file--.

COLUMN 3

Line 14, "sheet FS" should read --sheet FD--.

Signed and Sealed this

Twenty-fifth Day of July, 1989

Attest:

DONALD J. QUIGG

*Attesting Officer*

*Commissioner of Patents and Trademarks*